(12) United States Patent
Miller et al.

(10) Patent No.: US 11,514,391 B2
(45) Date of Patent: Nov. 29, 2022

(54) AUTHENTICATING A USER BY DELIVERY DEVICE USING UNIQUE VOICE SIGNATURES

(71) Applicant: International Business Machines Corporation, Armonk, NY (US)

(72) Inventors: Brent Miller, Cary, NC (US); Sachin Suhas Patwardhan, Pune (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 16/687,215

(22) Filed: Nov. 18, 2019

(65) Prior Publication Data
US 2021/0150469 A1    May 20, 2021

(51) Int. Cl.
| H04L 12/28 | (2006.01) |
| G06Q 10/08 | (2012.01) |
| G10L 25/51 | (2013.01) |
| H04W 12/06 | (2021.01) |
| H04J 1/16 | (2006.01) |

(52) U.S. Cl.
CPC .......... *G06Q 10/0833* (2013.01); *G10L 25/51* (2013.01); *H04W 12/06* (2013.01)

(58) Field of Classification Search
CPC ......... G06F 21/44; G10L 15/00; G10L 25/51; H04H 60/45; H04W 12/06; H04W 4/35; G06Q 10/0833; H04L 65/40
USPC ....................................... 370/252, 329, 386
See application file for complete search history.

(56) References Cited

U.S. PATENT DOCUMENTS

| 6,170,060 | B1 * | 1/2001 | Mott ..................... H04N 7/165 |
| | | | 348/E7.071 |
| 9,359,074 | B2 | 1/2016 | Ganesh |
| 9,262,612 | B2 | 2/2016 | Cheyer |
| 9,325,749 | B2 * | 4/2016 | Bangor ................. H04L 65/403 |
| 9,459,620 | B1 | 10/2016 | Schaffalitzky |
| 9,747,901 | B1 | 8/2017 | Gentry |

(Continued)

FOREIGN PATENT DOCUMENTS

| KR | 101949796 B1 | 2/2019 |
| WO | 2016039882 A1 | 3/2016 |

OTHER PUBLICATIONS

Shields, "Walmart is exploring blockchain for drone delivery", Sep. 5, 2018, 3 pps., <https//www.businessinsider.com/walmart-blockchain-drone-delivery-patent-2018-9?IR=T>.

*Primary Examiner* — John Pezzlo
(74) *Attorney, Agent, or Firm* — Marcus Walker; Alexander G. Jochym

(57) ABSTRACT

Aspects of the present invention disclose a method for a user-to-machine interaction to authenticate a user to a delivery device prior to completion of delivery of goods or items. The method includes one or more processors identifying initiation of a delivery associated with a user. The method further includes generating an audio signature that corresponds to the delivery. The method further includes providing a digital file that includes the audio signature to a computing device associated with the user. The method further includes providing the digital file that includes the audio signature to a delivery vehicle. The method further includes authenticating the user with the delivery vehicle based at least in part on the digital file of the user and the digital file of the delivery vehicle.

20 Claims, 3 Drawing Sheets

(56) References Cited

U.S. PATENT DOCUMENTS

| | | | |
|---|---|---|---|
| 10,373,226 B1* | 8/2019 | Russell | G06Q 30/0635 |
| 2011/0119290 A1* | 5/2011 | Dhoble | G16H 80/00 |
| | | | 707/769 |
| 2014/0254896 A1 | 9/2014 | Zhou | |
| 2014/0337075 A1* | 11/2014 | Taylor | G06Q 40/12 |
| | | | 705/7.15 |
| 2016/0294614 A1* | 10/2016 | Searle | H04L 67/34 |
| 2017/0090484 A1 | 3/2017 | Obaidi | |
| 2017/0186124 A1* | 6/2017 | Jones | G06Q 10/06311 |

* cited by examiner

US 11,514,391 B2

AUTHENTICATING A USER BY DELIVERY DEVICE USING UNIQUE VOICE SIGNATURES

BACKGROUND OF THE INVENTION

The present invention relates generally to the field of authentication, and more particularly to authenticating a user for a delivery using audio signatures.

Authentication is the process of identifying an individual, usually based on a username and password. In security systems, authentication is distinct from authorization, which is the process of giving individuals access to system objects based on their identity. Authentication merely ensures that the individual is who he or she claims to be but says nothing about the access rights of the individual.

A delivery device is an autonomous vehicle used to transport packages, food or other goods. Delivery devices are unmanned electro-mechanical devices that can deliver lightweight packages. Delivery devices are operated remotely, with operators potentially overseeing multiple delivery devices at once.

An audio signature is a type of electronic signature that uses audio in place of a handwritten signature. An audio signature is considered legally binding in both the private and public sectors under certain conditions. Audio signatures may be embedded into files and encrypted in order to prevent files and/or audio signatures from being disassociated or altered.

SUMMARY

Aspects of the present invention disclose a method, computer program product, and system for a user-to-machine interaction to authenticate a user to a delivery device prior to completion of delivery of goods or items. The method includes one or more processors identifying initiation of a delivery associated with a user. The method further includes one or more processors generating an audio signature that corresponds to the delivery. The method further includes one or more processors providing a digital file that includes the audio signature to a computing device associated with the user. The method further includes one or more processors providing the digital file that includes the audio signature to a delivery vehicle. The method further includes one or more processors authenticating the user with the delivery vehicle based at least in part on the digital file of the user and the digital file of the delivery vehicle.

DETAILED DESCRIPTION

Embodiments of the present invention allow for authentication by a delivery device that uses audio signatures to validate a user for dispensing an item of a delivery. Embodiments of the present invention convert an audio message associated with a user transaction into an audio signature. Additional embodiments of the present invention utilize an audio signature to authenticate a user in order to release items to the user.

Some embodiments of the present invention recognize that line-of-sight challenges exist in authentication systems utilizing biometric data or machine-readable labels to identify registered users. Consequently, these authentication systems are inefficient due to obstructions impeding a line-of-sight of the authentication system and the intended user or a machine-readable optical label. Thus, the authentication system must alter positions until an unobstructed line-of-sight is found. Various embodiments of the present invention solve this problem by utilizing various forms of audio recordings to authenticate an intended recipient. Thus, eliminating the line-of-sight challenges from the authentication process.

Various embodiments of the present invention can operate to reduce the amount of processing resources utilized by eliminating the processing resources utilized to process impractical images of an intended recipient. Embodiments of the present invention also reduce the amount of memory resources utilized by eliminating a need for storing voice samples of an intended recipient. Embodiments of the present invention also eliminate the need of human intervention in the authentication process. Further, embodiments of the present invention utilize audio verification, which requires less processing resources than video or image processing and also reduces time cost comparatively. For example, the present invention eliminates the need to print, display, or scan a delivery code. Additionally, the present invention provides a solution that is viable irrespective of language.

Implementation of embodiments of the invention may take a variety of forms, and exemplary implementation details are discussed subsequently with reference to the Figures.

Figure 1:
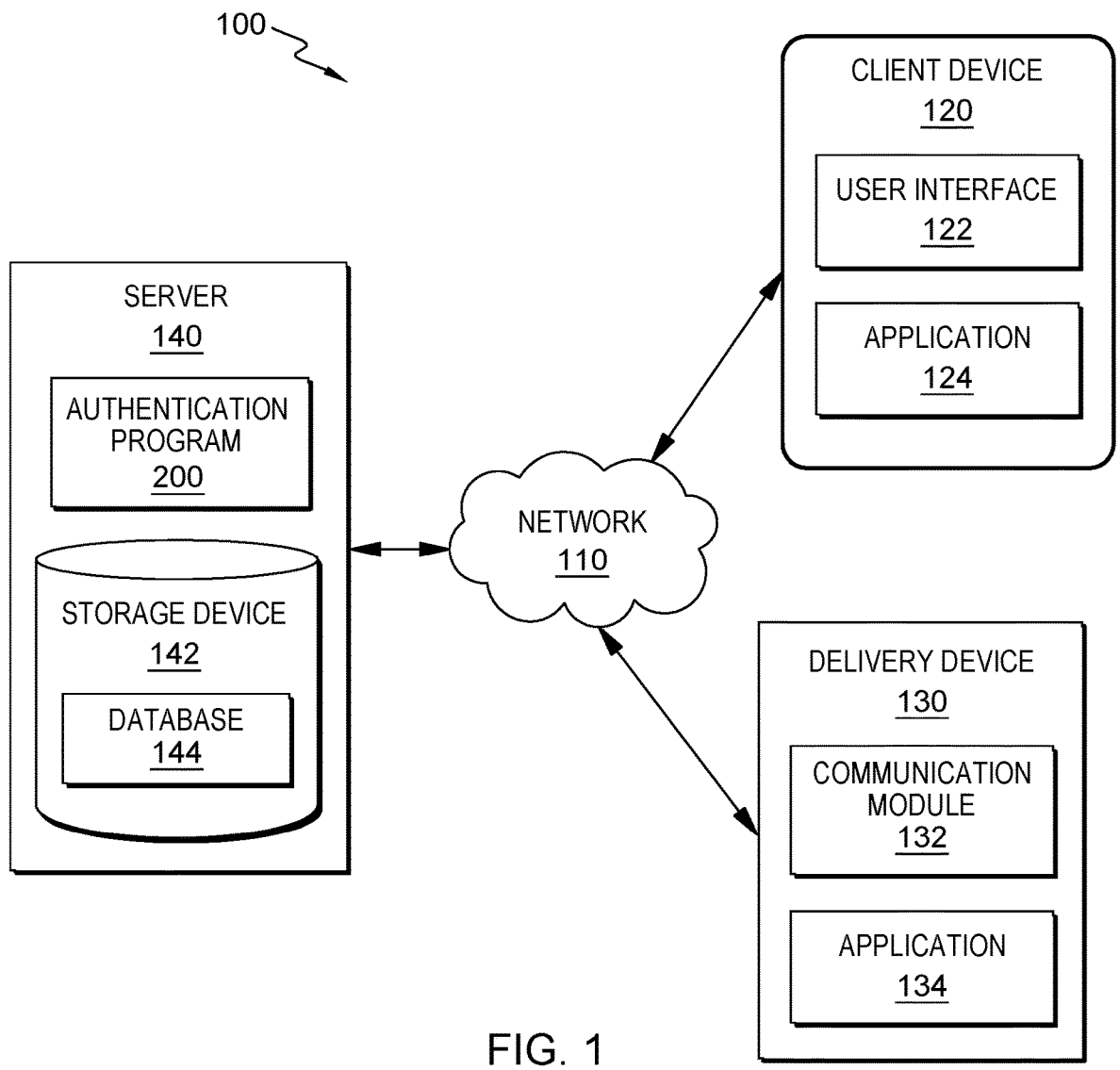
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data.

Authentication program 200 enables the authorized and secure processing of personal data. Authentication program 200 provides informed consent, with notice of the collection of personal data, allowing the user to opt in or opt out of processing personal data. Consent can take several forms.

Opt-in consent can impose on the user to take an affirmative action before personal data is processed. Alternatively, opt-out consent can impose on the user to take an affirmative action to prevent the processing of personal data before personal data is processed. Authentication program 200 provides information regarding personal data and the nature (e.g., type, scope, purpose, duration, etc.) of the processing. Authentication program 200 provides the user with copies of stored personal data. Authentication program 200 allows the correction or completion of incorrect or incomplete personal data. Authentication program 200 allows the immediate deletion of personal data.

An embodiment of data processing environment 100 includes client device 120, delivery device 130, and server 140, all interconnected over network 110. In one embodiment, client device 120, delivery device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, delivery device 130, and server 140, in accordance with embodiments of the present invention. In an example, server 140 transmits an audio message to client device 120 and delivery device 130 via the Internet (e.g., network 110). In this example, client device 120 transmits the audio message to delivery device 130 via near field communications (NFC) (e.g., network 110) for verification.

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes one or more speakers, a processor, a proximity sensor, a camera, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web application (e.g., client-server computer program) of authentication program 200 that is utilized to transmit and receive an audio message associated with the user. In another embodiment, a user utilizes application 124 of client device 120 to register with authentication program 200.

In various embodiments of the present invention, delivery device 130 may be an unmanned electro-mechanical device that includes a ground-based controller, either under remote control by a human operator or autonomously by onboard computers that is capable of executing computer readable program instructions, in accordance with embodiments of the present invention. In general, delivery device 130 is representative of any electronic device or combination of electronic devices capable of executing computer readable program instructions. Delivery device 130 may include components as depicted and described in further detail with respect to FIG. 3, in accordance with embodiments of the present invention.

Delivery device 130 may include one or more speakers, a processor, a proximity sensor, a navigational system, a camera, communications module 132, and application 134. Communications module 132 may be a radio transmitter/receiver, application, or a computer utilized to control delivery device 130. In addition, communications module 132 may be a global positioning system (GPS) or satellite receivers to navigate to a predetermined location. In one embodiment, delivery device 130 transports an item corresponding to a purchase of a user to an address of the user. In another embodiment, delivery device 130 utilizes application 134 to receive an audio message of a user and authentication program 200. For example, application 134 is a client-server computer program of authentication program 200 that is equivalent to the functionality of application 124 discussed above.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 includes storage device 142, database 144, and authentication program 200. Storage device 142 can be implemented with any type of storage device, for example, persistent storage 305, which is capable of storing data that may be accessed and utilized by server 140, delivery device 130, and client device 120, such as a database server, a hard disk drive, or a flash memory. In one embodiment storage device 142 can represent multiple storage devices within server 140. In various embodiments of the present invention storage device 142 stores a plurality of information, such as database 144. Database 144 may represent one or more organized collections of data stored and accessed from server 140. For example, database 144 includes an audio message of a user, purchase information, and/or delivery information. In one embodiment, data processing environment 100 can include additional servers (not shown) that host additional information that accessible via network 110.

Generally, authentication program 200 utilizes a user-to-machine interaction to authenticate a user to a delivery device prior to completion of delivery of goods or items. In one embodiment, authentication program 200 generates an audio signature. For example, authentication program 200 uses audible (e.g., captured or algorithmically generated) or non-audible (e.g., ultrasonic, infrasonic, etc.) sound to generate an audio signature of a user corresponding to a purchase of the user. In another embodiment, authentication program 200 transmits a generated audio signature to delivery device 130 and client device 120. For example, authentication program 200 sends a generated audio signature to a delivery vehicle (e.g., delivery device 130) and a mobile device (e.g., client device 120) of a user. In yet another embodiment, authentication program 200 utilizes a generated audio signature of client device 120 and delivery device 130 to authenticate a user in order to verify delivery. For example, authentication program 200 performs an equality comparison of an audio signature of a delivery vehicle (e.g., delivery device 130) and an audio signature a mobile device (e.g., client device 120) to determine whether the delivery vehicle and the mobile device have matching audio signatures. In this example, if authentication program 200 detects matching audio signatures, then authentication program 200 completes the verification process and dispenses purchased goods to the user.

Figure 2:
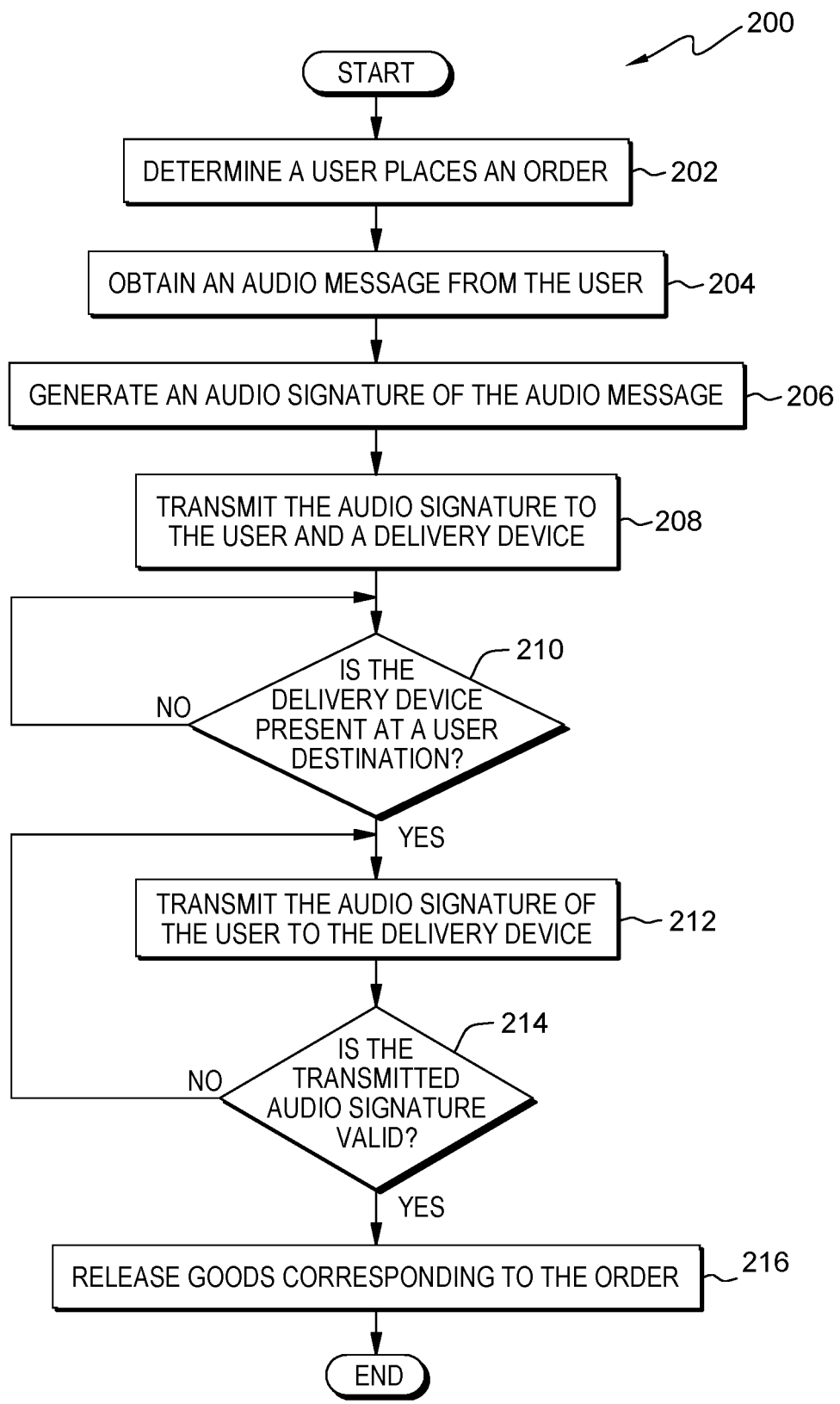
FIG. 2 is a flowchart depicting operational steps of a program, within the data processing environment of FIG. 1, for authentication by a delivery device that uses audio signatures to validate a user for dispensing an item of a delivery, in accordance with embodiments of the present invention.

FIG. 2 is a flowchart depicting operational steps of authentication program 200, a program to authenticate a user to a delivery vehicle in order to complete delivery of purchased goods, in accordance with embodiments of the present invention. In one embodiment, authentication program 200 initiates in response to client device 120 receiving a purchase confirmation from application 124. For example, authentication program 200 initiates when a mobile device (e.g., client device 120) receives a confirmation notification corresponding to a purchase. In another embodiment, authentication program 200 is continuously monitoring application 124 of client device 120. For example, authentication program 200 is constantly monitoring activities of a mobile device (e.g., client device 120) to detect a user using an application to purchase goods.

In step 202, authentication program 200 determines that a user places an order. In one embodiment, authentication program 200 determines that a user utilizes application 124 of client device 120 to purchase an item. For example, authentication program 200 monitors an application of a mobile device (e.g., client device 120) of a user and detects a purchase confirmation notification for an item via the application. In this example, authentication program 200 determines that the user an order for the item via the application. In another example, authentication program 200 utilizes a confirmation email of an email application (e.g., application 124) to determine that a user purchased an item from an e-commerce website. In yet another example, authentication program 200 utilizes calendar application data (e.g., appointments, user entries, etc.) of a computing device (e.g., client device 120) of a user to determine that the user is associated with a scheduled delivery. In another embodiment, authentication program 200 monitors application 124 of client device 120 to identify a user initiating delivery of an item. For example, authentication program 200 monitors a web user interface (e.g., application 124) to detect that a user is scheduling deliver of an item associated with the user.

In step 204, authentication program 200 obtains an audio message. In one embodiment, authentication program 200 utilizes client device 120 to capture an audio message. For example, authentication program 200 uses a mobile device (e.g., client device 120) to detect an input audio signal (e.g., audio message) from a user. In this example, authentication program 200 uses a microphone of the mobile device to capture the input audio signal (e.g., voice, song, movie dialogue, instrumental music, etc.) from the user. In addition, the input audio signal may derive from a file of the mobile device or the audio clip can be a recorded voice clip that the user registered in a profile or when making an online purchase.

In step 206, authentication program 200 generates an audio signature of the audio message. In one embodiment, authentication program 200 generates an audio signature from an audio message. For example, authentication program 200 encrypts an audio message and converts the audio message into an audio signature. In this example, authentication program 200 modifies (e.g., change a frequency, waveform, amplitude, etc.) the audio message and generates audible or non-audible audio signature that corresponds to the audio message.

In another example, authentication program 200 generates a random or algorithmically derived audio signature (e.g., white noise), which can be audible or inaudible (e.g., ultrasonic, infrasonic, etc.). Additionally, authentication program 200 uses digital signal processing (DSP) techniques to modify audio properties of a digital signal (e.g., audio message, audio signal, etc.) to generate a unique audio signature. In this example, authentication program 200 randomly changes the level of specific bass and/or treble frequencies through filtering, delays and repeats sounds of the digital signal to generate the unique audio signature.

In step 208, authentication program 200 transmits the audio signature to the user and a delivery device. In one embodiment, authentication program 200 transmits an audio signature to client device 120 and delivery device 130 via network 110. For example, authentication program 200 transmits a file, which includes an audio signature, through short range communications (e.g., WPAN, infrared data association (IrDA) protocols, etc.) to a delivery vehicle (e.g., delivery device 130) prior to the delivery vehicle departing with goods corresponding to a purchase of a user. In another example, authentication program 200 utilizes a client-side application (e.g., application 124) to transmit a file, which includes an audio signature, to a mobile device (e.g., client device 120) of a user. In another example, authentication program 200 delivers an audio signature to a delivery vehicle (e.g., delivery device 130) and a mobile device (e.g., client device 120) concurrently.

In another embodiment, a user may transmit an audio signature that authentication program 200 provides from client device 120 to another user device (not shown). For example, a user receives a file that includes an audio signature from authentication program 200 on a mobile device (e.g., client device 120) and transmits the file to an agent in order to allow the agent to receive items corresponding to a user purchase (i.e., providing a user with a capability to authorize other users). In one scenario, if a user is not nearby, the user may transmit a file that includes an audio signature to a trusted party who can be specified to perform the authentication action (discussed in step 216).

In decision step 210, authentication program 200 determines whether the delivery device is present at a user destination. In one embodiment, authentication program 200 utilizes data of communication module 132 to determine whether delivery device 130 is present at a location of a user. For example, authentication program 200 determines whether a delivery vehicle (e.g., delivery device 130) is within a threshold distance of a mobile device (e.g., client device 120) of a user. In this example, authentication program 200 monitors geolocation data (e.g., communication module 132) of the delivery vehicle to determine whether the delivery vehicle is in a threshold proximity to the address of the user.

Furthermore, authentication program 200 can transmit an audio signal over speakers of the delivery vehicle to the mobile device of the user to determine whether the delivery vehicle is within the threshold proximity (e.g., within audible range of the speakers of the delivery vehicle) to the user. For example, authentication program 200 determines whether the mobile device of the user detects the audio signal and provides confirmation to the delivery vehicle. Additionally, authentication program 200 can transmit an arrival alert. For example, authentication program 200 transmits the arrival alert to the user (via a client-side application, such as application 124) upon the delivery vehicle departing a warehouse, including an estimated time of arrival or arrival notification. In another example, authentication program 200 determines whether a delivery vehicle (e.g., delivery device 130) is within a threshold proximity to a mobile device (e.g., client device 120) of a user based on a WPAN connectivity (e.g., short-range communication) between the delivery vehicle and the mobile device.

If authentication program 200 determines that delivery device 130 is not within a threshold proximity of a user destination (decision step 210, "NO" branch), then authentication program 200 continues to monitor delivery device 130 to determine whether delivery device 130 has arrived at the user destination. In one scenario, if authentication program 200 determines that a delivery vehicle (e.g., delivery device 130) is presently located at an address of a user, but determines that a mobile device (e.g., client device 120) of the user is not within audible range of the delivery vehicle (i.e., mobile device does not provide confirmation of audio signal detection), then authentication program 200 may update an arrival notification to a user or continue to monitor for indication that the mobile device is within audible range of the delivery vehicle (i.e., monitor for a confirmation signal or tone from the mobile device). In another scenario, if authentication program 200 determines that a delivery vehicle (e.g., delivery device 130) is presently located at an address of a user, but determines that a mobile device (e.g., client device 120) of the user is not connected to a WPAN of the delivery vehicle, then authentication program 200 determines that the delivery vehicle is not within a threshold proximity of the mobile device and the delivery vehicle may use sensors (e.g., proximity, received signal strength indicators, etc.) to get closer to an object (e.g., house, mobile device, user, etc.) located at a user destination.

If authentication program 200 determines that delivery device 130 is within a threshold proximity of a user destination (decision step 210, "YES" branch), then authentication program 200 transmits an audio signature to delivery device 130 (e.g., utilizing application 124). In yet another scenario, if authentication program 200 determines that a delivery vehicle (e.g., delivery device 130) is presently located at an address of a user, and determines that a mobile device (e.g., client device 120) of the user is within audible range of the delivery vehicle, then authentication program 200 utilizes a client-side application (e.g., application 124) of the mobile device to play an audio signature.

In step 212, authentication program 200 transmits the audio signature of the user to the delivery vehicle. In one embodiment, authentication program 200 utilizes application 124 to transmit an audio signature of client device 120 to delivery device 130 (e.g., initiates playback of an audio signature, transmitted in step 208, on client device 120). For example, authentication program 200 uses a client-side application (e.g., application 124) of a mobile device (e.g., client device 120) to play an audio signature that authentication program 200 provided to the mobile device at the time of dispatching a delivery vehicle (e.g., delivery device 130) with items corresponding to a purchase of the user. In this example, the delivery vehicle utilizes a microphone to detect the mobile device playing the audio signature and stores the audio signature as a digital file.

In another embodiment, authentication program 200 utilizes short-range communications of client device 120 to transmit an audio signature of client device 120 to delivery device 130. For example, authentication program 200 uses a WPAN to connect a mobile device (e.g., client device 120) to a delivery vehicle (e.g., delivery device 130). In this example, authentication program 200 utilizes the WPAN connection to transmit a file to the delivery vehicle from the mobile device that includes the audio signature that authentication program 200 provided to the mobile device at the time of dispatching the delivery vehicle with items corresponding to a purchase of the user.

In decision step 214, authentication program 200 determines whether the transmitted audio signature is valid. In one embodiment, authentication program 200 utilizes application 134 to determine whether a transmitted audio signature of client device 120 matches an audio signature of delivery device 130. For example, authentication program 200 utilizes a client-side application (e.g., application 134) of a delivery vehicle (e.g., delivery device 130) to determine whether an audio signature provided by a mobile device (e.g., client device 120) of a user matches an audio signature of the client-side application provided to the delivery vehicle at the time of dispatching the delivery vehicle with items corresponding to a purchase of the user. In this example, authentication program 200 performs an equality comparison of a digital file that includes the audio signature of the mobile device and a digital file that includes the audio signature of the delivery vehicle to determine if the digital file of the mobile device matches the digital file of the delivery vehicle (i.e., validating a transmitted audio signature of the mobile device).

If authentication program 200 determines that an audio signature of client device 120 does not match an audio signature of delivery device 130 (decision step 214, "NO" branch), then authentication program 200 returns to step 212 to continue to monitor delivery device 130 to detect an audio signature of client device 120 that matches the audio signature of delivery device 130. In one scenario, if authentication program 200 performs an equality comparison of a digital file that includes an audio signature of a mobile device (e.g., client device 120) and determines that values of the digital file of the mobile device does not match values of a digital file that includes an audio signature of a delivery vehicle (e.g., delivery device 130), then authentication program 200 continues to monitor the delivery vehicle to detect a digital file of the mobile device that includes a matching audio signature. In one embodiment, authentication program 200 can monitor delivery device 130 for a specified time-period or number of iterations prior to ending the delivery attempt to a user.

In step 216, authentication program 200 releases goods corresponding to the order. More specifically, in response to authentication program 200 determining that an audio signature of client device 120 matches an audio signature of delivery device 130 (decision step 214, "YES" branch), then authentication program 200 verifies a user of client device 120 and approves a delivery transaction to the user. For example, authentication program 200 performs an equality comparison of a digital file that includes an audio signature of a mobile device (e.g., client device 120) and determines that values of the digital file of the mobile device match values of a digital file that includes an audio signature of a delivery vehicle (e.g., delivery device 130) and authorizes the delivery vehicle to dispense to the user items corresponding to a user purchase.

Figure 3:
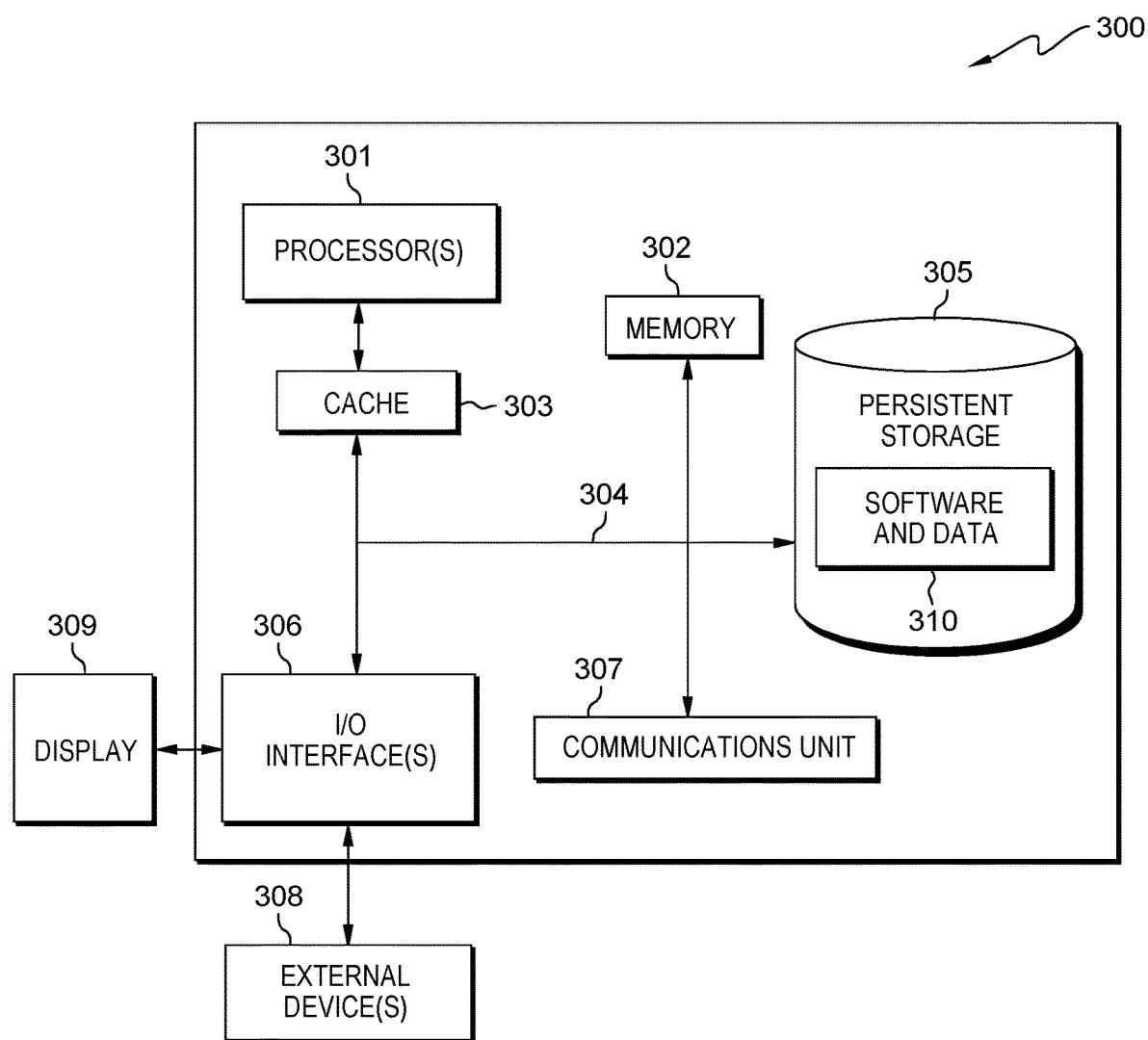
FIG. 3 is a block diagram of components of the client device and server of FIG. 1, in accordance with an embodiment of the present invention.

FIG. 3 depicts a block diagram of components of client device 120, delivery device 130 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to delivery device 130, software and data 310 includes data of communication module 132 and application 134. With respect to server 140, software and data 310 includes data of database 144 and authentication program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, initiation of a delivery associated with a user;
   generating, by one or more processors, an audio signature that corresponds to the delivery;
   providing, by one or more processors, a digital file that includes the audio signature to a computing device associated with the user;
   providing, by one or more processors, the digital file that includes the audio signature to a delivery vehicle; and
   authenticating, by one or more processors, the user with the delivery vehicle based at least in part on the digital file of the user that includes the audio signature and the digital file of the delivery vehicle that includes the audio signature.

2. The method of claim 1, further comprising:
   in response to a positive authentication of the user with the delivery vehicle, authorizing, by one or more processors, the delivery vehicle to dispense an item that corresponds to the delivery of the user.

3. The method of claim 1, further comprising:
in response to the user designating an agent as an authorized delivery recipient, transmitting, by one or more processors, the digital file that includes the audio signature to a second computing device associated with the agent.

4. The method of claim 1, further comprising:
determining, by one or more processors, that the delivery vehicle is present at a geolocation of the user;
broadcasting, by one or more processors, an audio signal utilizing the delivery vehicle; and
receiving, by one or more processors, a confirmation notification from the computing device associated with the user, wherein the confirmation notification corresponds to the computing device associated with the user detecting the audio signal.

5. The method of claim 1, wherein generating the audio signature that corresponds to the delivery, further comprises:
obtaining, by one or more processors, an audio message, wherein the audio message is an audio signal that selected from a group consisting of: a voice, a song, a movie dialogue, and a musical composition;
modifying, by one or more processors, the audio message; and
generating, by one or more processors, a non-audible representation of the modified audio message, wherein the non-audible representation is selected from a group consisting of:
ultrasonic frequencies and infrasonic frequencies.

6. The method of claim 1, wherein authenticating the user with the delivery vehicle based at least in part on the digital file of the user that includes the audio signature and the digital file of the delivery vehicle that includes the audio signature, further comprises:
in response to the delivery vehicle receiving the digital file of the computing device associated with the user, determining, by one or more processors, whether the digital file of the computing device associated with the user and the digital file of the delivery vehicle match, wherein the match is based at least in part on an equality comparison of the digital file of the computing device associated with the user and the digital file of the delivery vehicle.

7. The method of claim 1, further comprising:
generating, by one or more processors, a notification that includes an estimated time of arrival of the delivery vehicle;
transmitting, by one or more processors, the notification to the computing device associated with the user; and
updating, by one or more processors, the notification, wherein the update includes information selected from a group consisting of: delivery arrival and time of departure.

8. A computer program product comprising:
one or more computer readable storage media and program instructions stored on the one or more computer readable storage media, the program instructions comprising:
program instructions to identify initiation of a delivery associated with a user;
program instructions to generate an audio signature that corresponds to the delivery;
program instructions to provide a digital file that includes the audio signature to a computing device associated with the user;
program instructions to provide the digital file that includes the audio signature to a delivery vehicle; and
program instructions to authenticate the user with the delivery vehicle based at least in part on the digital file of the user that includes the audio signature and the digital file of the delivery vehicle that includes the audio signature.

9. The computer program product of claim 8, further comprising program instructions, stored on the one or more computer readable storage media, to:
in response to a positive authentication of the user with the delivery vehicle, authorize the delivery vehicle to dispense an item that corresponds to the delivery of the user.

10. The computer program product of claim 8, further comprising program instructions, stored on the one or more computer readable storage media, to:
in response to the user designating an agent as an authorized delivery recipient, transmit the digital file that includes the audio signature to a second computing device associated with the agent.

11. The computer program product of claim 8, further comprising program instructions, stored on the one or more computer readable storage media, to:
determine that the delivery vehicle is present at a geolocation of the user;
broadcast an audio signal utilizing the delivery vehicle; and
receive a confirmation notification from the computing device associated with the user, wherein the confirmation notification corresponds to the computing device associated with the user detecting the audio signal.

12. The computer program product of claim 8, wherein program instructions generate the audio signature that corresponds to the delivery, further comprise program instructions to:
obtain an audio message, wherein the audio message is an audio signal that selected from a group consisting of: a voice, a song, a movie dialogue, and a musical composition;
modify the audio message; and
generate a non-audible representation of the modified audio message, wherein the non-audible representation is selected from a group consisting of: ultrasonic frequencies and infrasonic frequencies.

13. The computer program product of claim 8, wherein program instructions authenticate the user with the delivery vehicle based at least in part on the digital file of the user that includes the audio signature and the digital file of the delivery vehicle that includes the audio signature, further comprise program instructions to:
in response to the delivery vehicle receiving the digital file of the computing device associated with the user, determine whether the digital file of the computing device associated with the user and the digital file of the delivery vehicle match, wherein the match is based at least in part on an equality comparison of the digital file of the computing device associated with the user and the digital file of the delivery vehicle.

14. The computer program product of claim 8, further comprising program instructions, stored on the one or more computer readable storage media, to:
generate a notification that includes an estimated time of arrival of the delivery vehicle;
transmit the notification to the computing device associated with the user; and
update the notification, wherein the update includes information selected from a group consisting of: delivery arrival and time of departure.

15. A computer system comprising:
one or more computer processors;
one or more computer readable storage media; and
program instructions stored on the computer readable storage media for execution by at least one of the one or more processors, the program instructions comprising:
program instructions to identify initiation of a delivery associated with a user;
program instructions to generate an audio signature that corresponds to the delivery;
program instructions to provide a digital file that includes the audio signature to a computing device associated with the user;
program instructions to provide the digital file that includes the audio signature to a delivery vehicle; and
program instructions to authenticate the user with the delivery vehicle based at least in part on the digital file of the user that includes the audio signature and the digital file of the delivery vehicle that includes the audio signature.

16. The computer program product of claim 15, further comprising program instructions, stored on the one or more computer readable storage media, to:
in response to a positive authentication of the user with the delivery vehicle, authorize the delivery vehicle to dispense an item that corresponds to the delivery of the user.

17. The computer system of claim 15, further comprising program instructions, stored on the one or more computer readable storage media for execution by at least one of the one or more processors, to:
in response to the user designating an agent as an authorized delivery recipient, transmit the digital file that includes the audio signature to a second computing device associated with the agent.

18. The computer system of claim 15, further comprising program instructions, stored on the one or more computer readable storage media for execution by at least one of the one or more processors, to:
determine that the delivery vehicle is present at a geolocation of the user;
broadcast an audio signal utilizing the delivery vehicle; and
receive a confirmation notification from the computing device associated with the user, wherein the confirmation notification corresponds to the computing device associated with the user detecting the audio signal.

19. The computer system of claim 15, wherein program instructions to generate the audio signature that corresponds to the delivery, further comprise program instructions to:
obtain an audio message, wherein the audio message is an audio signal that selected from a group consisting of: a voice, a song, a movie dialogue, and a musical composition;
modify the audio message; and
generate a non-audible representation of the modified audio message, wherein the non-audible representation is selected from a group consisting of: ultrasonic frequencies and infrasonic frequencies.

20. The computer system of claim 15, wherein program instructions to authenticate the user with the delivery vehicle based at least in part on the digital file of the user that includes the audio signature and the digital file of the delivery vehicle that includes the audio signature, further comprise program instructions to:
in response to the delivery vehicle receiving the digital file of the computing device associated with the user, determine whether the digital file of the computing device associated with the user and the digital file of the delivery vehicle match, wherein the match is based at least in part on an equality comparison of the digital file of the computing device associated with the user and the digital file of the delivery vehicle.

\* \* \* \* \*